(No Model.)
J. A. STENBERG.
RAZOR.
No. 489,995.
Patented Jan. 17, 1893.
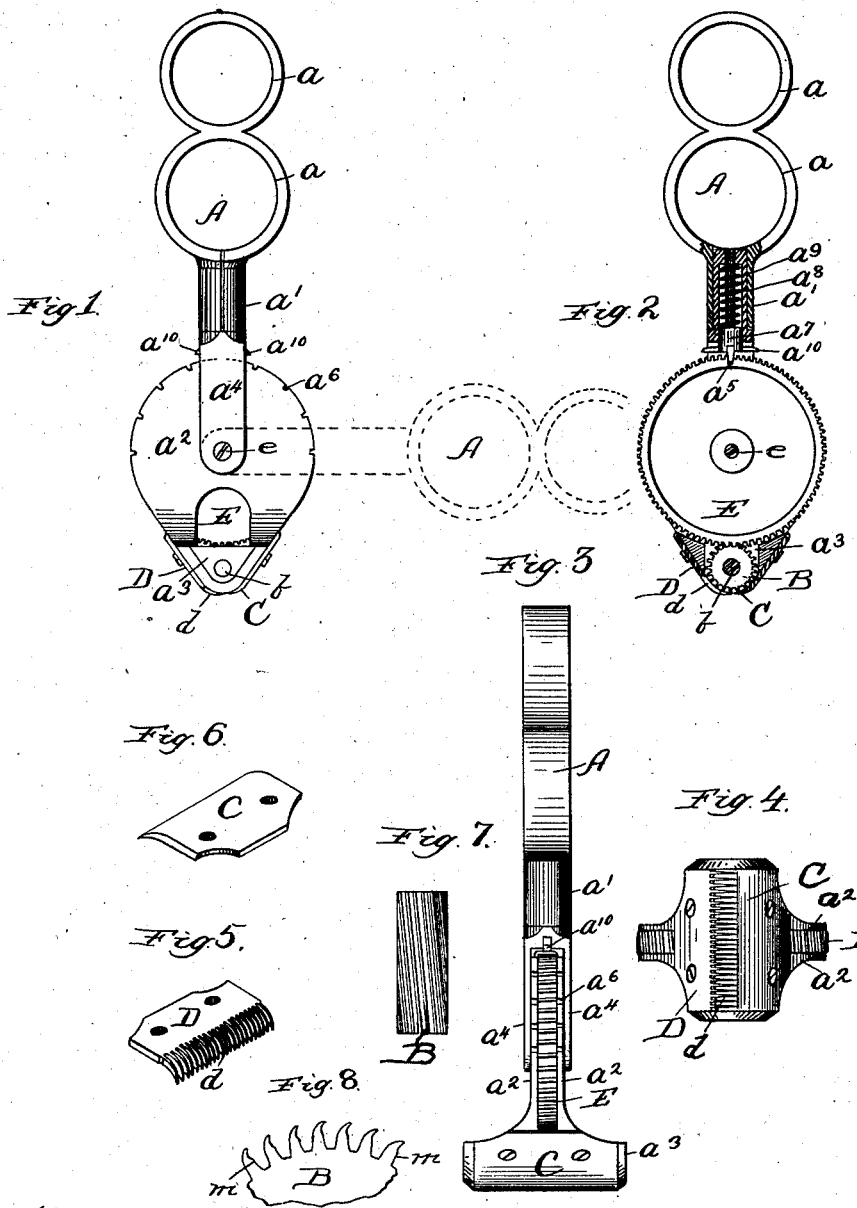

UNITED STATES PATENT OFFICE.

JOHN A. STENBERG, OF LA VERGNE, ILLINOIS.

RAZOR.

SPECIFICATION forming part of Letters Patent No. 489,995, dated January 17, 1893.

Application filed March 28, 1892. Serial No. 426,682. (No model.)

*To all whom it may concern:*

Be it known that I, JOHN A. STENBERG, a citizen of the United States, residing at La Vergne, in the county of Cook and State of Illinois, have invented a new and useful Improvement in Razors, of which the following is a specification.

This invention is designed to provide a tool for removing the beard which may be used in place of and which obviates many of the inconvenient and objectionable features pertaining to the ordinary razor. It has been devised more especially for use at home rather than by the barber in the barber shop, but it may be used by the barber upon others with good effect and without the injurious and painful results usually attending too close or too frequent shaving.

My improved implement embodies a spirally toothed or ribbed rotating cylinder, which acts in conjunction with a stationary blade to cut the beard very much in the way a lawn mower severs the grass. It also embodies a suitable device for rotating the cylinder, preferably a gear meshing directly with the cutting teeth or ribs of the former and adapted to be actuated by the thumb or finger, and a suitable handle in which the cylinder and motor device are properly housed and supported. A comb-like guard is also placed over the exposed portion of the cylinder at the cutting point so as to prevent the skin from being caught between the cutting devices.

All the features are fully illustrated in the drawings accompanying this application and forming part thereof, Figure 1 therein being a side view, Fig. 2 a vertical section, Fig. 3 a front or edge view and Fig. 4 a top view of the invention; Figs. 5, 6 and 7 are views of the comb, the stationary blade and the rotary cylinder, respectively. Fig. 8 is an exaggerated end view of the cylinder teeth.

In said drawings A represents the handle of the implement, which I prefer to fashion as shown, that is to say with eyes or openings $a\ a$, each adapted to receive one of the fingers of the hand by which the razor is held and operated, and a shank or plain portion $a'$. A proper housing for the cutting cylinder and its actuating device is attached to this handle, and may consist of the plates or cheeks $a^2\ a^2$, and the triangular portion $a^3$, the former supporting the journal of the actuating device and the latter supporting and covering the cylinder. A joint permitting movement by the handle may be employed to unite the handle and housing if desired, and I prefer that construction as it allows the handle to be moved to position at right angles to the cutter, as indicated at dotted lines Fig. 1 or to an intermediate angle. When thus changed in position it will perhaps better suit some users. I have had no difficulty however in using the implement upon all parts of the face when the handle is in line with the cutter as shown by the full lines. The joint referred to is perhaps best made by providing the stem with arms $a^4$ pivoted upon the pivot or journal of the actuating gear hereinafter described, and to lock the handle in its desired position, spring depressed catches $a^5$, adapted to enter notches $a^6$ in the periphery of the cheeks are provided. These catches are supported upon a block $a^7$ movably held in the hollow stem $a^8$ in one piece with the arms $a^4$, and acted upon by the spring $a^9$. To release the catches, the block $a^7$ is provided with projections $a^{10}$ adapted to be lifted by the finger. As shown at Fig. 2 the stem $a^8$ is made separate from and placed within the hollow of stem $a'$. This however is not a necessary feature, as the stems may be made in one piece.

The spirally toothed or ribbed cutting cylinder is shown at B. It is preferably made hollow and supported upon a journal or arbor $b$, the ends of which find support in the ends of the top portion $a^3$ of the handle. The teeth of cylinder B are adapted to act with a stationary blade or opposing cutter C, secured to the part $a^3$ at one side of the opening in the latter which uncovers the cylinder to the beard. At the other side of the opening is secured the guard D having comb like teeth $d$ extending to the edge of the blade C and preventing the skin from getting into the cutting devices, but permitting the entrance and severing of the beard.

For operating the cylinder any suitable motor device or connection may be used, but I prefer to employ a gear E meshing directly with the cutting cylinder, thereby obviating the necessity of providing a special driving gear upon the cylinder. Of course any gear meshing with the cylinder itself must not injure the teeth of the latter, and I therefore make the teeth of gear E spiral to conform to the spiral inclination of the teeth upon the cylinder. Said gear E is supported upon a shaft e, which may also carry the arms $a^4$ as already stated. The gear E is of considerably larger diameter than the cylinder so that the latter will have a comparatively rapid rotation. The gear is also located so that its periphery may be pressed upon by and receive actuating power from the thumb of the same hand which supports the razor.

The operation of the device is as follows:— The user inserts two of his fingers, preferably the third and fourth, in the eyes $a$ and with his other finger or fingers resting against and supporting the stem, he presses his thumb against the gear E and moves it in the direction in which it is desired to rotate the same. The rotation of the gear thus imparted is continued as long as necessary by repeating the operations described with the thumb, and gives the necessary movement to the cylinder. While thus holding and operating the cylinder the razor is moved over the face preferably in a direction to bring the hairs of the beard directly against the sharp or acting edge of the plate C, and thus insure their being acted upon by the cylinder and said plate.

My device is well adapted to use without any preliminary softening of the beard in the customary way, removes only the beard instead of cutting away a layer of the skin with the beard after the manner of the ordinary razor, does not irritate or injure the skin in any way, is not dangerous to handle, can be used with safety on shipboard or a railway car, and does not quickly or early become dull. It is also light, compact and inexpensive to manufacture.

While the spiral character of cutting teeth upon the cylinder is more desirable than straight teeth would be, my invention ought not to be limited to the spiral feature. And it is obvious that instead of making the teeth themselves spiral, they may be straight and the opposing stationary jaw or blade can be made spiral instead. Either the teeth or the blade are however preferably spiral because when thus constructed they are adapted to sever only a few of the whiskers at the same instant, whereas if both were straight they might act upon so many at once as to require more power than could be well supplied in an instrument of this character. The teeth are also preferably undercut upon their forward side as shown in Fig. 8 as thereby they are adapted to cut more easily. The undercut does not however extend to the root of the tooth, but preferably ceases at $m$. This leaves the base of the tooth to receive the impact of the teeth of the operating gear and preserves the cutting edge from dulling by such contact. The teeth of the gear are preferably formed so that they will operate upon the part $m$ instead of the cutting jaw.

It will be noticed that the cutting cylinder is entirely inclosed in my razor except at the operating point, thus avoiding catching and winding up of the hair or whiskers growing upon adjacent parts of the face which are not shaved, and also avoiding any accidental interference with or retarding of the cylinder by extraneous means other than such as is expected to be met with at the cutting point; also that the cutting devices are located in a projecting part and preferably upon the end of the implement, and as near the extremity as may be, the cylinder being placed just inside the angle formed by the convergence of the sides of the triangular housing $a^3$. By the latter features, the operating point is permitted to be pressed well against the skin without unnecessary resistance by surrounding parts. It will also be seen that the guard does not extend over but stops at the edge of the blade C so that the cutting may take place at the surface of the skin instead of at a remove therefrom.

I claim:—

1. The improved razor consisting of a handle, a rotary toothed cutting cylinder an inclosing support for said cylinder, an opposing stationary blade, a guard D, and means for actuating said cylinder, substantially as set forth.

2. The improved razor consisting of a handle, a rotary toothed cutting cylinder an inclosing support for said cylinder, an opposing stationary blade, and a gear adapted to be rotated by a thumb or finger pressing upon its periphery and acting to give motion to the cylinder, substantially as set forth.

3. The improved razor consisting of a handle, a rotary toothed cutting cylinder, an opposing stationary blade, and a gear adapted to be rotated by a thumb or finger pressing upon its periphery and meshing with the cylinder, substantially as set forth.

4. The combination in a razor, of a rotating toothed cutting cylinder, and a gear for actuating the same meshing directly with the cutting teeth of the cylinder, substantially as set forth.

5. The razor having a rotary cutting cylinder, means adapted to be actuated by the thumb for rotating said cylinder, and a handle having eyes for the fingers, whereby the thumb is left at full liberty to actuate the cylinder, substantially as specified.

6. The combination in a razor of cutting devices of the kind described, a suitable housing for the same, and a handle adjustably secured to the housing, substantially as set forth.

7. The combination in a razor, of a handle having eyes to receive the fingers, a gear supported in the handle and adapted to be rotated by the thumb, and a rotary cutting cylinder receiving motion from said gear, substantially as specified.

8. The combination in a razor of the adjustable handle, the cheeks $a^2$ having notches $a^6$ in their periphery, and the locking catch $a^5$, substantially as specified.

9. The razor the cutting devices whereof consist of the inclosed rotary cutting cylinder and an opposing stationary blade or edge, substantially as specified.

JOHN A. STENBERG.

Witnesses:
 H. W. O. MUNDAY,
 LEW. E. CURTIS.